(12) United States Patent
Suissa

(10) Patent No.: US 9,365,089 B2
(45) Date of Patent: Jun. 14, 2016

(54) METHOD AND APPARATUS FOR ACTIVE SUSPENSION DAMPING INCLUDING NEGATIVE STIFFNESS

(71) Applicant: GM GLOBAL TECHNOLOGY OPERATIONS LLC, Detroit, MI (US)

(72) Inventor: Avshalom Suissa, Kiryat Ono (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/106,963

(22) Filed: Dec. 16, 2013

(65) Prior Publication Data

US 2015/0165858 A1  Jun. 18, 2015

(51) Int. Cl.
*B60G 17/048* (2006.01)
*B60G 17/04* (2006.01)

(52) U.S. Cl.
CPC .......... *B60G 17/048* (2013.01); *B60G 17/0408* (2013.01); *B60G 2500/20* (2013.01); *B60G 2500/22* (2013.01)

(58) Field of Classification Search
CPC ... B60G 17/0416; B60G 17/0408; H02K 5/24
USPC ...................................... 280/5.515
See application file for complete search history.

(56) References Cited

U.S. PATENT DOCUMENTS

| | | | | |
|---|---|---|---|---|
| 3,995,883 A | * | 12/1976 | Glaze | 280/5.507 |
| 4,579,366 A | * | 4/1986 | Doi et al. | 280/5.515 |
| 4,583,752 A | * | 4/1986 | Breitbach | B60G 11/32 280/124.165 |
| 4,710,656 A | * | 12/1987 | Studer | 310/51 |
| 4,969,662 A | | 11/1990 | Stuart | |
| 5,310,157 A | * | 5/1994 | Platus | 248/619 |
| 5,780,948 A | * | 7/1998 | Lee et al. | 310/81 |
| 5,839,742 A | * | 11/1998 | Holt | 280/124.134 |
| 5,988,610 A | * | 11/1999 | Hiraki et al. | 267/140.13 |
| 6,290,035 B1 | | 9/2001 | Kazmirski et al. | |
| 6,688,618 B2 | | 2/2004 | Schmidt et al. | |
| 6,793,049 B2 | | 9/2004 | Kazmirski | |
| 7,150,451 B2 | | 12/2006 | Soles et al. | |
| 7,963,377 B2 | | 6/2011 | Quinn et al. | |
| 8,185,269 B2 | | 5/2012 | Li et al. | |
| 8,210,547 B2 | | 7/2012 | Rodenbeck | |
| 8,313,108 B2 | * | 11/2012 | Ac et al. | 280/5.5 |
| 8,575,804 B2 | | 11/2013 | Nakatsugawa | |
| 2003/0189300 A1 | * | 10/2003 | Burdock | 280/5.515 |
| 2005/0051987 A1 | * | 3/2005 | Saitoh et al. | 280/124.134 |
| 2010/0301571 A1 | * | 12/2010 | van der Knaap et al. | 280/5.507 |
| 2011/0278425 A1 | * | 11/2011 | Park | 248/636 |
| 2011/0297497 A1 | | 12/2011 | Kim | |
| 2012/0119463 A1 | * | 5/2012 | Paulides et al. | 280/124.106 |
| 2013/0087985 A1 | | 4/2013 | Marur | |

FOREIGN PATENT DOCUMENTS

| | | |
|---|---|---|
| DE | 4014466 A1 | 11/1991 |
| DE | 19809545 C1 * | 5/1999 |
| EP | 0127741 A1 | 12/1984 |

* cited by examiner

*Primary Examiner* — James English

(57) ABSTRACT

A suspension assembly between a sprung element and an unsprung element includes an active suspension system having a controllable load-carrying spring element arranged with a negative stiffness element between the sprung element and the unsprung element. The negative stiffness element has a negative stiffness constant that opposes a positive spring rate of the active suspension system to achieve a zero total spring stiffness of the suspension assembly under static conditions.

18 Claims, 10 Drawing Sheets

METHOD AND APPARATUS FOR ACTIVE SUSPENSION DAMPING INCLUDING NEGATIVE STIFFNESS

TECHNICAL FIELD

This disclosure relates to devices for damping vibration between a sprung element and an unsprung element employing active elements.

BACKGROUND

The statements in this section merely provide background information related to the present disclosure. Accordingly, such statements are not intended to constitute an admission of prior art.

Suspension systems are employed to decouple a sprung element from impulse and vibration energy inputs by absorbing and dissipating vibration inputs that are experienced at an unsprung element. Suspension systems are employed on both stationary systems and mobile systems including passenger vehicles. Known suspension system elements include spring elements coupled in parallel and/or in series with damping elements, e.g., shock absorbers that include fluidic or pneumatic energy absorbing and dissipating features.

When employed on a vehicle system, suspension systems including springs and dampers are configured to coincidentally provide performance characteristics related to passenger ride comfort, vehicle handling and road holding capability. Ride comfort is generally managed in relation to spring constant of the main springs of the vehicle, spring constant of passenger seating, tires and a damping coefficient of the damper. For optimum ride comfort, a relatively low damping force or a soft ride is preferred. Vehicle handling relates to variation in a vehicle's attitude, which is defined in terms of roll, pitch and yaw. For optimum vehicle handling, relatively large damping forces or a firm ride are required to avoid excessively rapid variations in vehicle attitude during cornering, acceleration and deceleration. Road holding ability generally relates to an amount of contact between the tires and the ground. To optimize road handling ability, large damping forces are required when driving on irregular surfaces to prevent loss of contact between individual wheels and the ground. Known vehicle suspension dampers employ various methods to adjust damping characteristics to be responsive to changes in vehicle operational characteristics.

Active vehicle suspension systems employ actuators that control various suspension parameters to dynamically adjust one or more of passenger ride comfort, vehicle handling and road holding capability during vehicle operation in response to operating conditions. Such actuators are controlled by hydraulic, pneumatic, or other power sources that can consume on-vehicle power.

SUMMARY

A suspension assembly between a sprung element and an unsprung element includes an active suspension system having a controllable load-carrying spring element arranged with a negative stiffness element between the sprung element and the unsprung element. The negative stiffness element has a negative stiffness constant that opposes a positive spring rate of the active suspension system to achieve a zero total spring stiffness of the suspension assembly under static conditions.

BRIEF DESCRIPTION OF THE DRAWINGS

One or more embodiments will now be described, by way of example, with reference to the accompanying drawings, in which:

FIG. 7-1 illustrates another exemplary suspension assembly including an active suspension system and a negative stiffness element to actively dampen vibration between a sprung element and an unsprung element, in accordance with the disclosure;

FIG. 7-2 illustrates a schematic side view of a negative stiffness element including a first permanent magnet assembly coaxial to a second permanent magnet assembly, in accordance with the disclosure;

FIG. 12-1 illustrates operating data associated with simulated performance of a vehicle executing a maneuver for evaluating suspension system performance including vehicle heave acceleration (g) in relation to time (sec), in accordance with the disclosure;

FIG. 12-2 illustrates operating data associated with simulated performance of a vehicle executing a maneuver for evaluating suspension system performance including vehicle heave acceleration (g) in relation to frequency (Hz), in accordance with the disclosure;

FIG. 12-3 illustrates operating data associated with simulated performance of a vehicle executing a maneuver for evaluating suspension system performance including energy flow (liter/min) in relation to frequency (Hz), in accordance with the disclosure;

DETAILED DESCRIPTION

Figure 1:
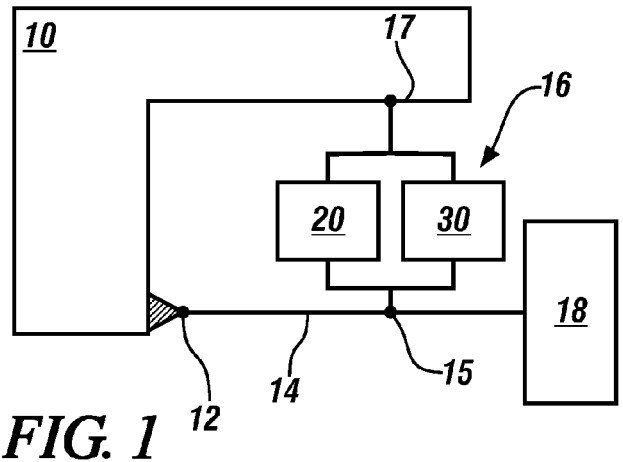
FIG. 1 illustrates a suspension assembly including a negative stiffness element that is employed to dampen vibration between a sprung element and an unsprung element, in accordance with the disclosure.

Referring now to the drawings, wherein the showings are for the purpose of illustrating certain exemplary embodiments only and not for the purpose of limiting the same, FIG. 1 schematically illustrates a suspension assembly 16 including a load-carrying active suspension system 20 and a negative stiffness element 30 that is employed to dampen vibration between a sprung element 10 and an unsprung element 18. As shown, the sprung element is a body 10 of a vehicle and the unsprung element includes a lower control arm 14 supporting a wheel assembly 18 that contacts a ground surface. The lower control arm 14 attaches to the body 10 at hinge point 12, and works in concert with an upper control arm to provide seating elements for mounting the wheel assembly 18. Details for mounting a vehicle wheel assembly 18 are known and thus not described herein. The active suspension system 20 is configured to provide a fully active suspension, e.g., an active hydro-pneumatic (AHP) system for enhanced load accommodation and leveling, and ride and handling performance responsive to static loading and dynamic forces acting on the vehicle.

Active suspension systems include hardware and control mechanisms that are responsive to static loads, dynamic loads and load transfer, vehicle parking, and fail-safe operations. Hardware and control mechanisms for vehicle trimming and leveling are configured to be responsive to static loads and static load changes. Hardware and control mechanisms configured to effect a leveling lock are responsive to vehicle parking maneuvers. Hardware and control mechanisms responsive to dynamic loads and load transfer, vehicle parking, and fail-safe operations preferably include disengagement mechanisms to disengage one or more elements of the active suspension system. Hardware and control mechanisms responsive to dynamic loads and load transfer preferably include mechanisms that effect large damping forces or a firm suspension to avoid excessively rapid variations in vehicle attitude during cornering, acceleration and deceleration and prevent loss of contact between individual wheels and the ground. The terms spring rate, spring constant and stiffness are analogous terms that all refer to a change in force exerted by a spring in relation to the deflection of the spring.

The negative stiffness element 30 interacts with the active suspension system 20 to provide preferred ride and handling performance while accommodating static and dynamic load changes, including supporting a large load in conjunction with a low dynamic stiffness to isolate vibrations. This enables reduction of the total spring rate of the suspension assembly 16 to a magnitude that is at or near zero while maintaining static load carrying capability. The suspension assembly 16 effects preferred ride for passenger comfort and wheel/tire road grip for safety while having sensitivity to static load changes due to mass changes and dynamic load changes during handling maneuvers while minimizing energy consumption of the active suspension system 20. A controller 55 is configured to control elements of the active suspension system 20 and the negative stiffness element 30 responsive to the changes in operating conditions as indicated by on-vehicle sensors and modeled performance parameters. The active suspension system 20 includes a load-carrying element that supports and transfers static and dynamic forces and load inputs between the unsprung element 14 and the sprung element 10, i.e., the lower control arm 14 and the body 10. As shown, the negative stiffness element 30 is arranged in parallel with the active suspension system 20. As shown, the active suspension system 20 and the negative stiffness element 30 co-terminate on the body 10 at hinge point 17 and co-terminate on the lower control arm 14 at hinge point 15.

The negative stiffness element 30 acts in concert with the active suspension system 20 between the sprung element 10 and the unsprung element 14, including introducing a spring force that is counter to the spring force introduced by the active suspension system 20. The counter force of the negative stiffness element 30 assists in separating the sprung element 10 and the unsprung element 14. The negative stiffness element 30 preferably has a negative stiffness constant of a magnitude that cancels the positive spring rate of the active suspension system 20 to achieve a low or zero total spring stiffness at low deflections of the active suspension system 20 under static conditions.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 100 microseconds, 3.125, 6.25, 12.5, 25 and 100 milliseconds during ongoing vehicle operation. Alternatively, routines may be executed in response to occurrence of an event.

Figure 2:
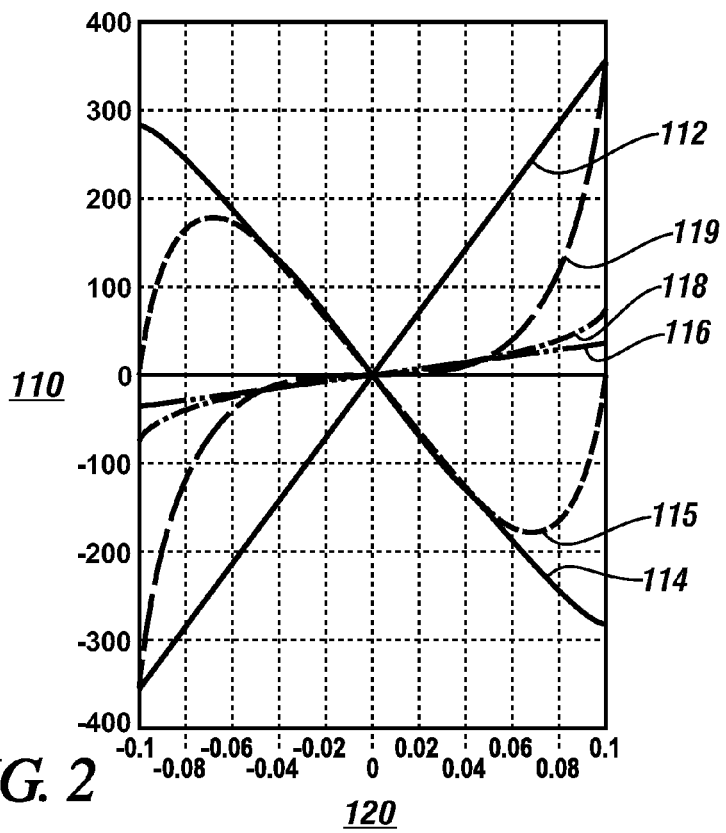
FIG. 2 illustrates deflection (m, travel) on a horizontal axis and load (N) on a vertical axis for suspension components including a spring and a negative stiffness element, in accordance with the disclosure.

FIG. 2 graphically shows deflection (m, travel) on a horizontal axis 120 and load (N) on a vertical axis 110 for suspension components including a spring and a negative stiffness element, with the deflection occurring between a sprung element and an unsprung element. A total positive spring rate of the suspension without a negative stiffness element is shown on line 112 without a static load carrying component, and depicts a linear relation k between the deflection and the load. Line 116 depicts an idealized deflection in relation to load for a suspension system to achieve a force exerted between the sprung element and the unsprung element that is substantially constant regardless of the displacement, thus achieving a substantially constant force on the sprung element, e.g., a vehicle body, regardless of the force exerted on the unsprung element, e.g., a wheel. A negative stiffness element provides a spring force that is counter to the spring rate 112. A negative stiffness element having a linear displacement is shown at line 114 along with a negative stiffness element having a non-linear displacement, shown at line 115. Line 118 graphically shows deflection for a system that combines the spring rate for the linear spring shown on line 112 and the spring rate for the negative stiffness element having linear displacement shown at line 114. Line 119 graphically shows deflection for a system that combines the spring rate for the suspension shown on line 112 and the spring rate for the negative stiffness element having non-linear displacement shown at line 115. The performance shown at line 119 including deflection for a system that combines the spring rate for the suspension shown on line 112 and the spring rate for the negative stiffness element having non-linear displacement achieves a low or zero total spring stiffness at low deflections, with increasing stiffness at greater deflections. Such spring performance achieves preferred performance characteristics related to passenger ride comfort, vehicle handling and road holding capability, including a soft spring (numerically small spring rate k) to produce a good isolation and therefore an operator-perceived comfortable ride in combination with a hard spring (numerically large spring rate k) to reduce the roll and pitch angles associated with steering and braking/accelerating maneuvers.

A negative stiffness element having linear displacement across its entire range provides improved ride performance as compared to a negative stiffness element having non-linear displacement. A negative stiffness element having non-linear displacement helps to reduce energy consumption in sharp turning maneuvers. Using a negative stiffness element having a non-linear displacement may eliminate a need to actively engage and disengage the negative stiffness element during a driving maneuver. There may still be a preference to configure the negative stiffness element to be engaged and disengaged for vehicle parking and/or for a fail-safe operation.

Figure 3:
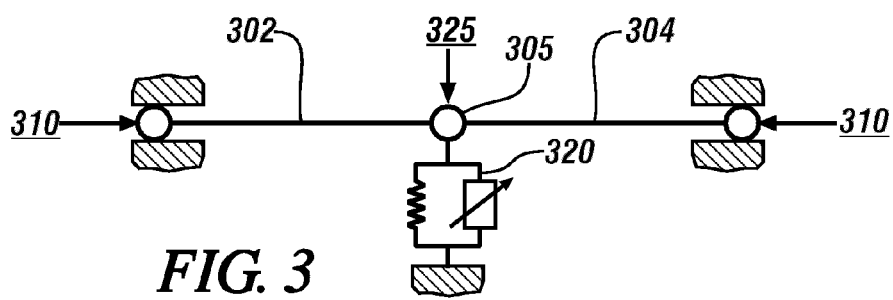
FIG. 3 illustrates a free-body diagram for an embodiment of a suspension assembly including an active suspension system and a negative stiffness element that are employed to dampen vibration between a sprung element and an unsprung element, in accordance with the disclosure.

FIG. 3 shows a free-body diagram for an embodiment of a suspension assembly including an active suspension system 320 and a negative stiffness element that are employed to dampen vibration between a sprung element and an unsprung element. The active suspension system 320 includes a spring having a stiffness constant $K_{SV}$ and a controllable damper element that can be dynamically adjusted. The negative stiffness element is shown in the form of rigid elements 302 and 304 connected in parallel at junction 305 and force P 310 exerted on the distal ends of the elements 302 and 304 in a nominally horizontal direction. The negative stiffness element is described in terms of a negative stiffness constant $K_N$. The negative stiffness constant $K_N$ is tunable, and can be determined in relation to pre-loaded force P 310 and lengths of the rigid elements 302 and 304. The negative stiffness constant $K_N$ can be tuned to a preferred negative stiffness by varying the length l of each of the rigid elements 302 and 304, pre-loading the force P 310 that is exerted on the distal ends of the elements 302 and 304 in the horizontal direction including adjusting the stiffness of a spring employed in the suspension system to effect the pre-loading force P 310. As such, the negative stiffness constant $K_N$ can be determined in accordance with the following relationship:

$$K_N = \frac{F_N}{\delta} = \frac{2P}{l}$$ [1]

wherein $F_N$ is the total normal, nominally horizontal force exerted on the rigid elements 302 and 304, δ is deflection of the rigid elements 302 and 304 in the nominally vertical direction at junction 305, and
l is the length of each of the rigid elements 302 and 304.

The controllable spring 320 acts in the nominally vertical direction with the dynamically adjustable stiffness constant $K_{SV}$. Force 325 is exerted by the sprung element on the suspension system in the vertical direction at junction 305. The overall spring constant K for the suspension system is a difference between the dynamically adjustable stiffness constant $K_{SV}$ and the negative stiffness constant $K_N$, which can be determined in accordance with the following relationship.

$$K = K_{SV} - K_N$$ [2]

Preferably, the dynamically adjustable stiffness constant $K_{SV}$ is controlled in relation to the negative stiffness constant $K_N$ such that the overall spring constant K results in zero vertical deflection at junction 305 of the sprung element regardless of the magnitude of the force 325 exerted by the sprung element on the suspension system in the vertical direction at junction 305. This configuration facilitates a suspension system that is capable of supporting a large static load with a low dynamic stiffness to effectively isolate vibration, while enabling a total controllable spring constant that approaches zero under static conditions responsive to variations in static vehicle loading and responsive to dynamic load changes associated with vehicle handling, cornering and rough road conditions.

Figure 4:
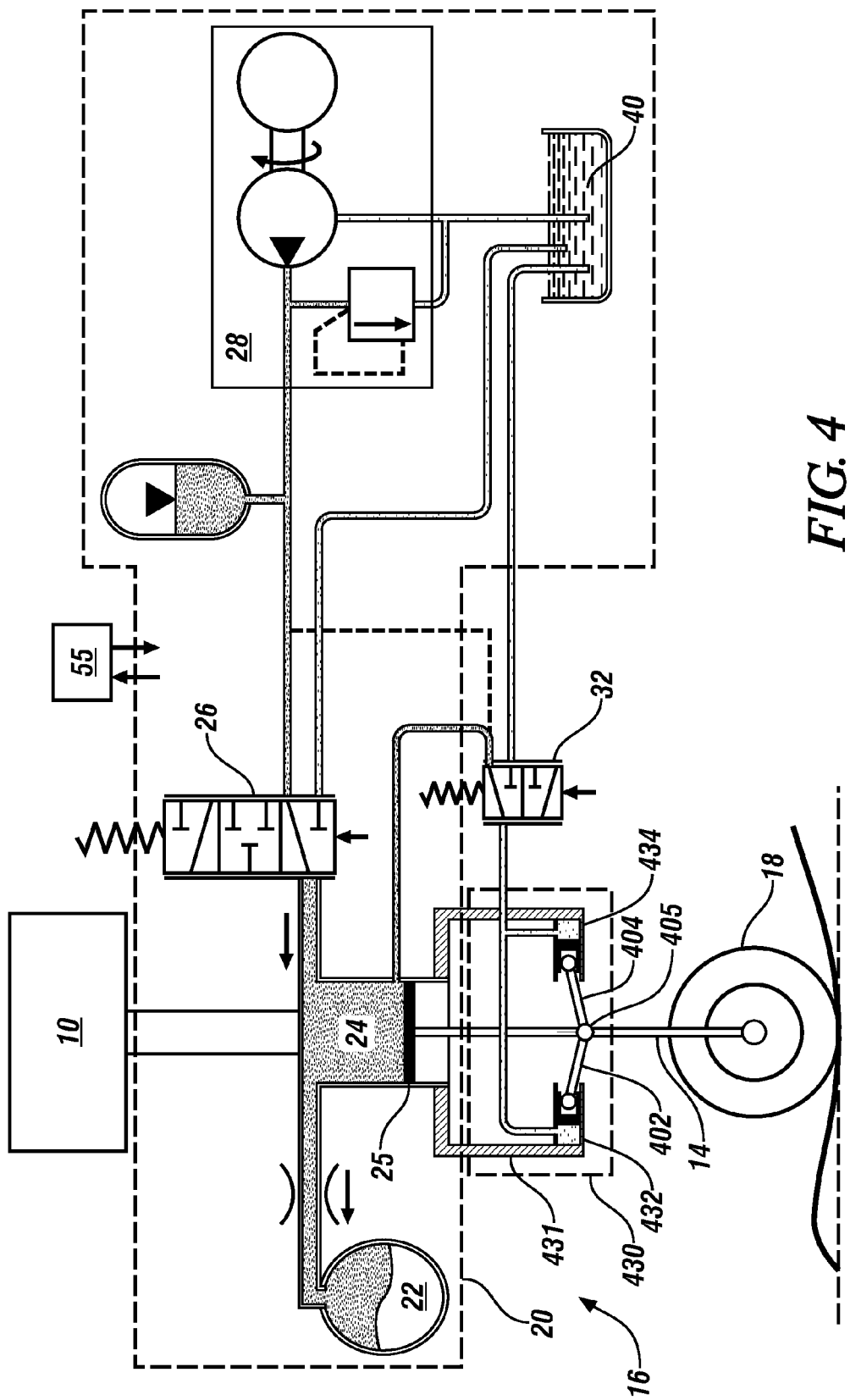
FIG. 4 illustrates an exemplary suspension assembly including an active suspension system and a negative stiffness element to actively dampen vibration between a sprung element and an unsprung element, in accordance with the disclosure.

FIG. 4 schematically shows an embodiment of the suspension assembly 16 including active suspension system 20 and a negative stiffness element 430 controlled by controller 55 to actively dampen vibration between the sprung element 10, e.g., a vehicle body and the unsprung element 18, e.g., a wheel to dynamically achieve preferred operating parameters associated with passenger ride comfort, vehicle handling and road holding capability during ongoing operation. The suspension assembly 16 shown herein is associated with a single one of the corners or wheels of a motorized vehicle. A four-wheeled vehicle may employ the suspension assembly 16 on all four corners. Alternatively, a four-wheeled vehicle may employ the suspension assembly 16 on the front corners, with portions of the suspension assembly 16, e.g., the active suspension system 20 employed on the rear corners in conjunction with an anti-roll bar or torsion bars. Anti-roll bars and torsion bars may also be employed in the front corners.

The active suspension system 20 includes a gas spring 22, cylinder 24, a first multi-state flow control valve 26 and a constant pressure fluidic source 28. The constant pressure source 28 supplies fluid, e.g., air or hydraulic fluid at a constant pressure to the cylinder 24, which produces a vertical force on a piston 25 that is transferred via a vertical member to a junction 405 in the negative stiffness element 430. The cylinder 24 also fluidly couples to the gas spring 22 to provide a dynamically adjustable spring function through the cylinder 24 for the active suspension system 20. The cylinder 24 further fluidly couples via a second multi-state flow control valve 32 to the negative stiffness element 430.

The negative stiffness element 430 includes opposed fluidic cylinders 432 and 434 mounted in a frame 431 that rigidly connects to the cylinder 24. Moveable pistons in the opposed fluidic cylinders 432 and 434 connect to distal ends of rigid elements 402 and 404, respectively, each having proximal ends that couple to the junction 405. Pressure to the fluidic cylinders 432 and 434 originates from the constant pressure source 28 and is channeled through the cylinder 24 and the second multi-state flow control valve 32. The fluidic cylinders 432 and 434 generate compressive force on the distal ends of the rigid elements 402 and 404 in this embodiment to urge the lower control arm 14 away from the body 10 to effect negative stiffness. Specific design features, including lengths of the rigid elements 402 and 404 and the spring constant of the gas spring 22 are selected to achieve an overall spring constant K of the combined elements of the active suspension system 20 that is at or near zero under static loading.

In operation, when the first multi-state flow control valve 26 is controlled in a first position (as shown) and the second multi-state flow control valve 32 is controlled in a first position (as shown), the active suspension system 20 operates in concert with the negative stiffness element 430. The negative stiffness element 430 can be deactivated by controlling the second multi-state flow control valve 32 to a second position allowing the fluid to drain to a reservoir 40. This action eliminates the negative stiffness, which may be desirable during road handling maneuvers and rough road events, for parking maneuvers and as part of a fail-safe system.

Figure 5:
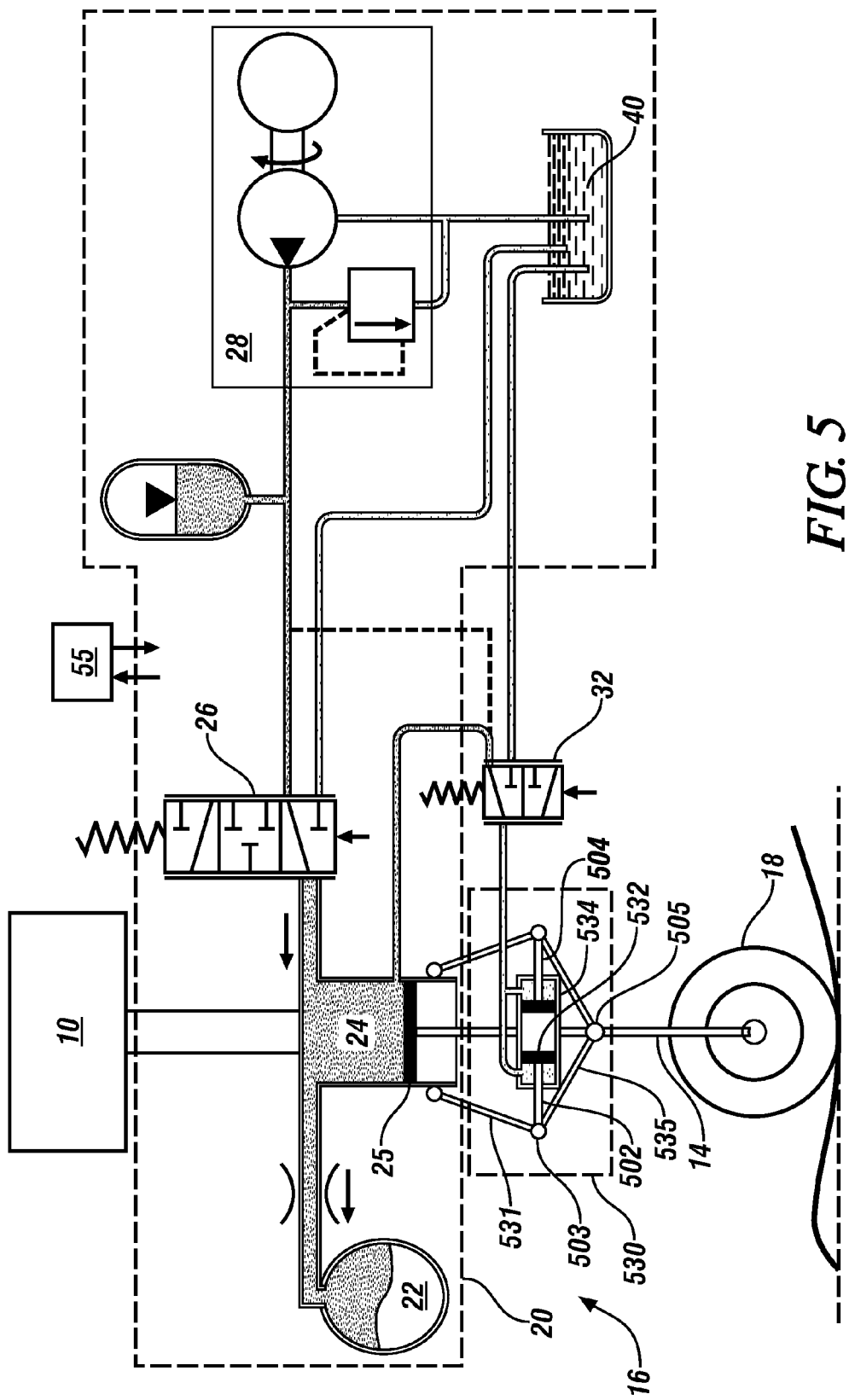
FIG. 5 illustrates another exemplary suspension assembly including an active suspension system and a negative stiffness element to actively dampen vibration between a sprung element and an unsprung element, in accordance with the disclosure.

FIG. 5 schematically shows another embodiment of the suspension assembly 16 including active suspension system 20 and a negative stiffness element 530 controlled by controller 55 to actively dampen vibration between the sprung element 10, e.g., a vehicle body and the unsprung element 18, e.g., a wheel to achieve preferred operating parameters associated with passenger ride comfort, vehicle handling and road holding capability during ongoing operation. The suspension assembly 16 shown herein is associated with a single one of the corners or wheels of a motorized vehicle.

The active suspension system 20 includes a gas spring 22, cylinder 24, a first multi-state flow control valve 26 and a constant pressure fluidic source 28. The constant pressure source 28 supplies fluid, e.g., air or hydraulic fluid at a constant pressure to the cylinder 24, which produces a vertical force on a piston that is transferred via a vertical member to a junction 505 in the negative stiffness element 530. The cylinder 24 also fluidly couples to the gas spring 22 to provide a spring function. The cylinder 24 further fluidly couples via a second multi-state flow control valve 32 to the negative stiffness element 530.

The negative stiffness element 530 includes first opposed members 531 coupled to the cylinder 24 coupled at junction 503 to second opposed members 535 coupled to the lower control arm 14 at junction 505. Rigid elements 502 and 504 have distal ends that couple to the junction 503 and proximal ends that couple to the junction 505. Opposed fluidic cylinders 532 and 534 connect to distal ends of the rigid elements 502 and 504, respectively. The fluidic cylinders 532 and 534 generate tensile force on the distal ends of the rigid elements 502 and 504 in this embodiment to urge the lower control arm 14 away from the body 10 to effect negative stiffness. Pressure to the fluidic cylinders 532 and 534 originates from the constant pressure source 28 and is channeled through the cylinder 24 and the second multi-state flow control valve 32. Specific design features, including lengths of the rigid elements 502 and 504 and the spring constant of the gas spring 22 are selected to achieve an overall spring constant K of the combined elements of the active suspension system 20 that is at or near zero under static loading.

When the first multi-state flow control valve 26 is controlled in a first position (as shown) and the second multi-state flow control valve 32 is controlled in a first position (as shown), the active suspension system 20 operates in concert with the negative stiffness element 530. The negative stiffness element 530 can be deactivated by controlling the second multi-state flow control valve 32 to a second position allowing the fluid to drain to reservoir 40. This action reduces or eliminates the effect of the negative stiffness element, which may be desirable during road handling maneuvers and rough road events.

Figure 6:
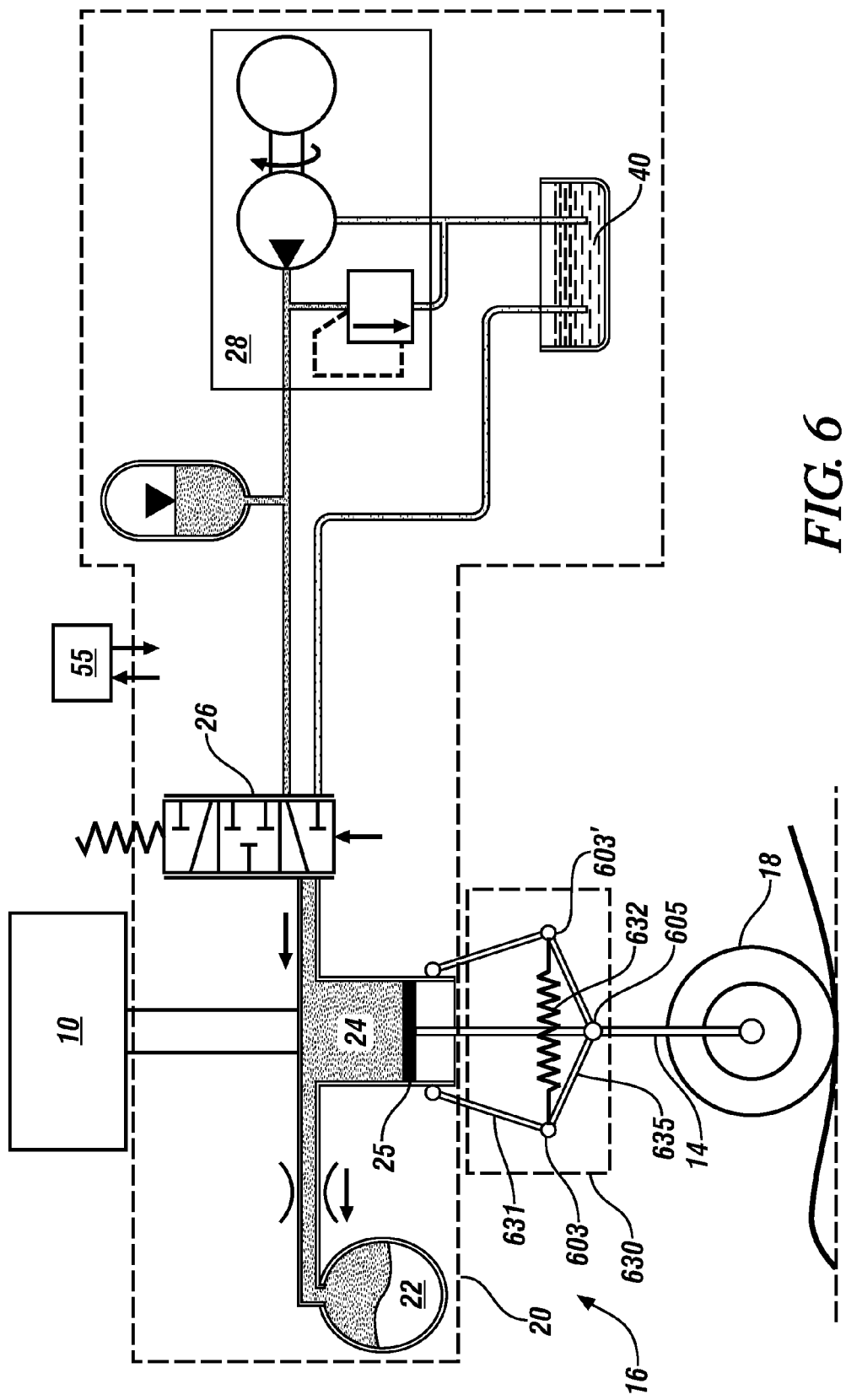
FIG. 6 illustrates another exemplary suspension assembly including an active suspension system and a negative stiffness element to actively dampen vibration between a sprung element and an unsprung element, in accordance with the disclosure.

FIG. 6 schematically shows another embodiment of the suspension assembly 16 including active suspension system 20 and a negative stiffness element 630 controlled by controller 55 to actively dampen vibration between the sprung element 10, e.g., a vehicle body and the unsprung element 18, e.g., a wheel to achieve preferred operating parameters associated with passenger ride comfort, vehicle handling and road holding capability during ongoing operation. The suspension assembly 16 shown herein is associated with a single one of the corners or wheels of a motorized vehicle.

The active suspension system 20 includes a gas spring 22, cylinder 24, a first multi-state flow control valve 26 and a constant pressure fluidic source 28. The constant pressure source 28 supplies fluid, e.g., air or hydraulic fluid at a constant pressure to the cylinder 24, which produces a vertical force on a piston that is transferred via a vertical member to a junction 605 in the negative stiffness element 630. The cylinder 24 also fluidly couples to the gas spring 22 to provide a spring function.

The negative stiffness element 630 includes first opposed members 631 coupled to second opposed members 635 at junctions 603 and 603' with spring 632 in tension between junctions 603 and 603'. Distal ends of the first opposed members 631 couple to the cylinder 24 and distal ends of the second opposed members 635 couple to the lower control arm 14 at junction 605. Spring 632 is exerts a tensile force between junctions 603 and 603' to urge the lower control arm 14 away from the body 10 to effect negative stiffness. Specific design features, including the spring constant of the spring 632 and the spring constant of the gas spring 22 are selected to achieve an overall spring constant K of the combined elements of the active suspension system 20 that is at or near zero under static loading. In operation, when the first multi-state flow control valve 26 is controlled in a first position (as shown) the active suspension system 20 operates in concert with the negative stiffness element 630.

Figure 7:
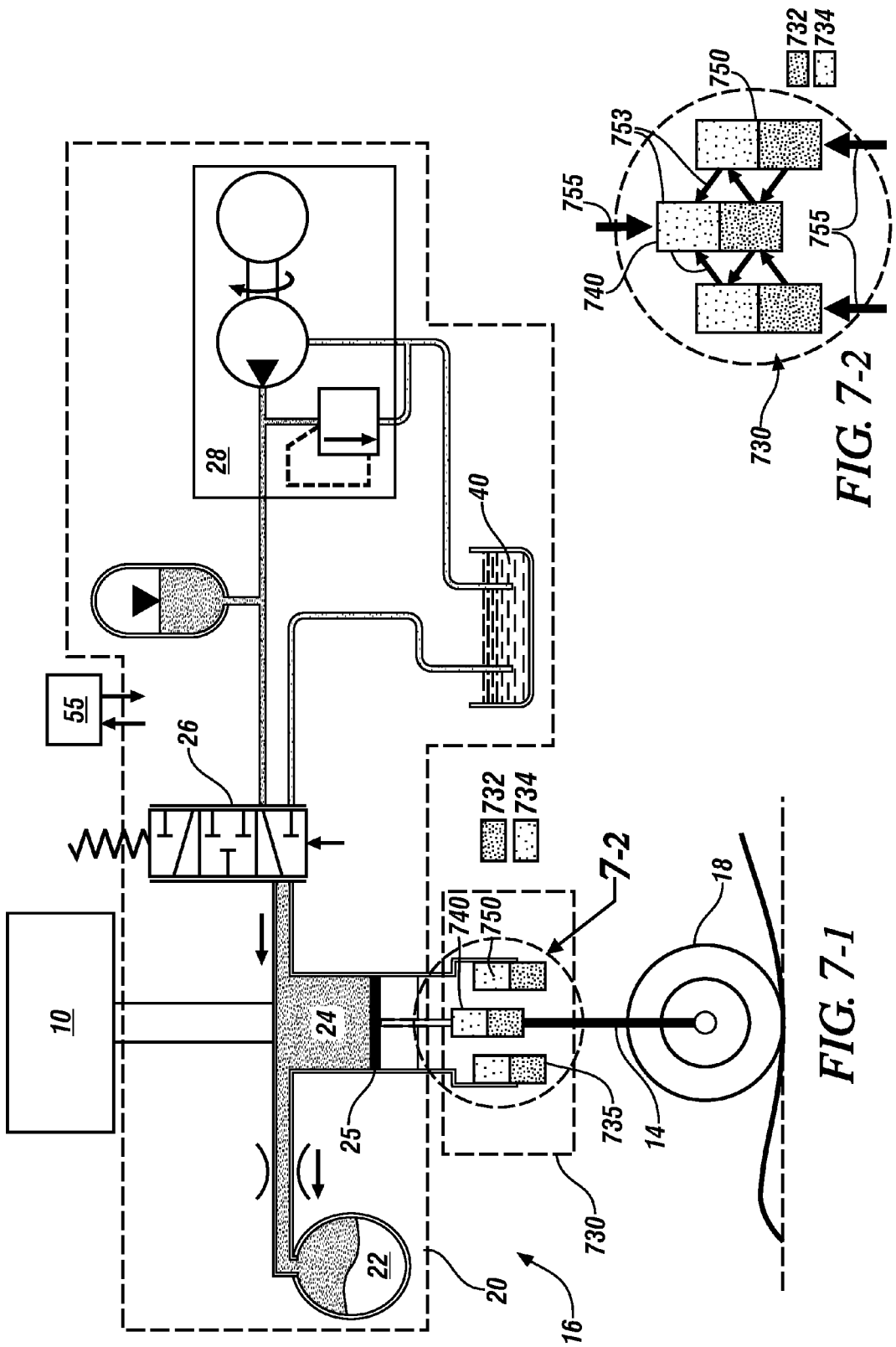

FIG. 7-1 schematically shows another embodiment of the suspension assembly 16 including active suspension system 20 and a negative stiffness element 730 controlled by controller 55 to actively dampen vibration between the sprung element 10, e.g., a vehicle body and the unsprung element 18, e.g., a wheel to achieve preferred operating parameters associated with passenger ride comfort, vehicle handling and road holding capability during ongoing operation. The suspension assembly 16 shown herein is associated with a single one of the corners or wheels of a motorized vehicle.

The active suspension system 20 includes a gas spring 22, cylinder 24, a first multi-state flow control valve 26 and a constant pressure fluidic source 28. The constant pressure source 28 supplies fluid, e.g., air or hydraulic fluid at a constant pressure to the cylinder 24, which produces a vertical force on a moveable piston 25 that is transferred via a vertical member to a first permanent magnet assembly 740 of the negative stiffness element 730. The cylinder 24 also fluidly couples to the gas spring 22 to provide a spring function. The active suspension system 20 is arranged in a series configuration with the negative stiffness element 730 as shown. Alternatively the active suspension system 20 can be arranged in a parallel configuration with the negative stiffness element 730 between the sprung element 10 and the unsprung element 18.

The negative stiffness element 730 includes the first permanent magnet assembly 740 configured as a cylindrically shaped plunger coaxial to a second permanent magnet assembly 750 configured as a coaxial annular tube. The second permanent magnet assembly 750 fixedly couples to walls of the cylinder 24. The first and second permanent magnet assemblies 740, 750 are configured as a plurality of opposed permanent magnets 735 having nominal north polarities 732 and south polarities 734 that are configurable to a first position in a mutually repelling state and configurable to a second position with the opposed permanent magnets in a non-mutually repelling state. The negative stiffness element 730 opposes the spring force exerted on the piston 25 by the gas spring 22.

FIG. 7-2 is a schematic side view of the negative stiffness element 730 including the first permanent magnet assembly 740 coaxial to second permanent magnet assembly 750 including the magnetic polarities nominally referred to as north 732 and south 734. Force vectors are shown including compressive force 755 and repelling magnetic forces 753 acting between the respective north magnetic poles 732 of the adjacent permanent magnet assemblies 740 and 750 and between the respective south magnetic poles of the adjacent permanent magnet assemblies 740 and 750. By way of reference, a magnetic element having a mass of 1 kg is able to generate a repelling force of 3000 N, which can be used in designing appropriate sizes and configurations for the opposed permanent magnet assemblies 740 and 750 to effect a desired negative stiffness. The repelling forces urge the lower control arm 14 away from the body 10 to effect negative stiffness. The negative stiffness element 730 can be deactivated by changing orientation of the first permanent magnet assembly 740 relative to second permanent magnet assembly 750 to neutralize magnetic polarities.

Figure 8:
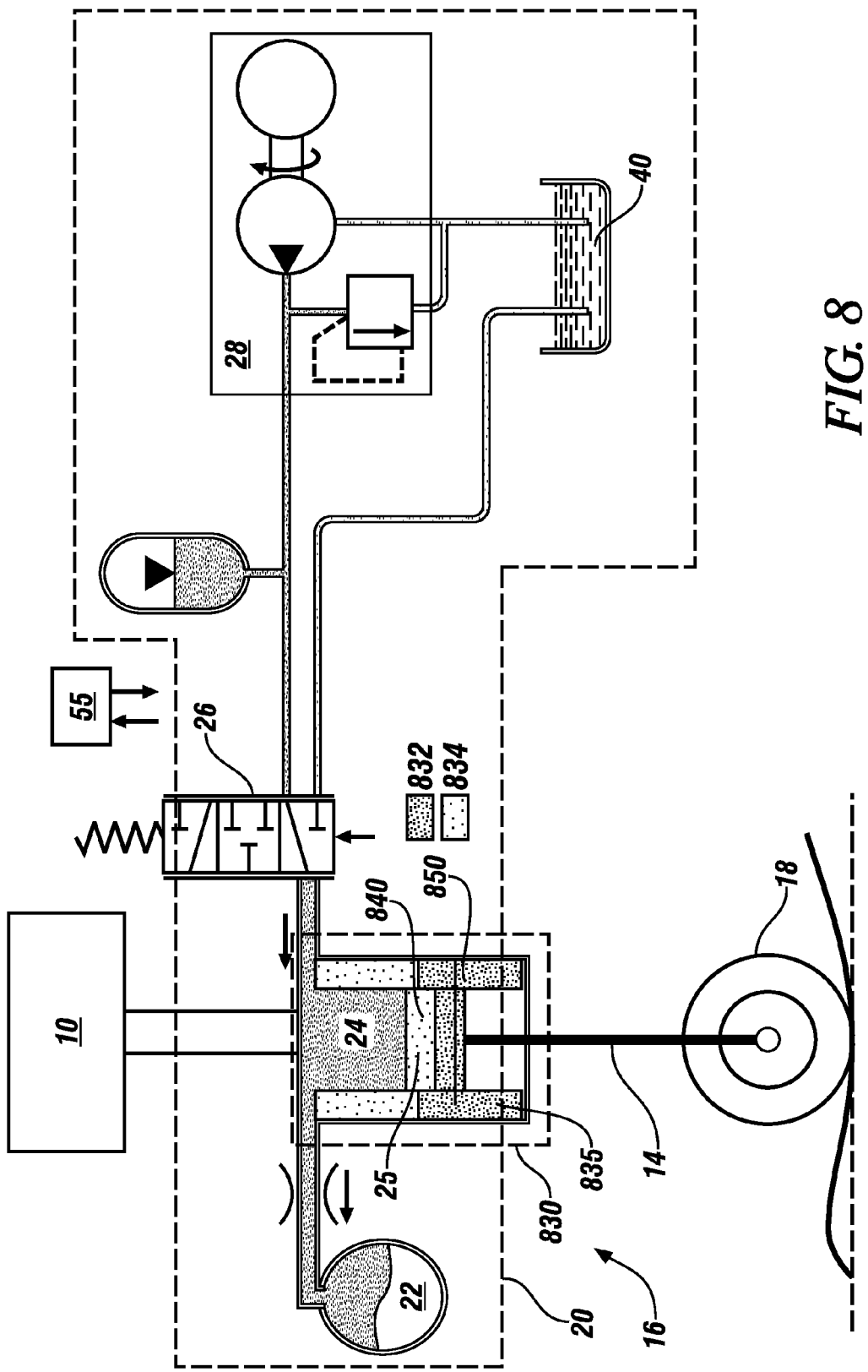
FIG. 8 illustrates another exemplary suspension assembly including an active suspension system and a negative stiffness element to actively dampen vibration between a sprung element and an unsprung element, in accordance with the disclosure.

FIG. 8 schematically shows another embodiment of the suspension assembly 16 including active suspension system 20 and a negative stiffness element 830 controlled by controller 55 to actively dampen vibration between the sprung element 10, e.g., a vehicle body and the unsprung element 18, e.g., a wheel to achieve preferred operating parameters associated with passenger ride comfort, vehicle handling and road holding capability during ongoing operation. The suspension assembly 16 shown herein is associated with a single one of the corners or wheels of a motorized vehicle.

The active suspension system 20 includes a gas spring 22, cylinder 24, a first multi-state flow control valve 26 and a constant pressure fluidic source 28. The constant pressure source 28 supplies fluid, e.g., air or hydraulic fluid at a constant pressure to the cylinder 24, which produces a vertical force on a piston 25 that includes a first permanent magnet assembly 840 of the negative stiffness element 830. The cylinder 24 also fluidly couples to the gas spring 22 to provide a spring function. The negative stiffness element 830 is further integrated into the cylinder 24 in that the second permanent magnet assembly 850 is incorporated into the walls of the cylinder 24 and thus couples to the body 10 to transfer force thereto. As such, the active suspension system 20 may be arranged in a series configuration with the negative stiffness element 830 as shown. The negative stiffness element 830 opposes the spring force exerted on the piston 25 by the gas spring 22.

The negative stiffness element 830 includes a plurality of opposed permanent magnets 835 having nominal north polarities 832 and south polarities 834 that are configurable to a first position in a mutually repelling state and configurable to a second position with the opposed permanent magnets in a non-mutually repelling state. In one embodiment, the opposed permanent magnet assemblies include the first permanent magnet assembly 840 configured as a cylindrically shaped plunger coaxial to the second permanent magnet assembly 850 configured as a coaxial annular tube. The first permanent magnet assembly 840 is integrated into the piston 25 of the cylinder 24 and couples to the lower control member 14, and the second permanent magnet assembly 850 is integrated into the walls of the cylinder 24. In operation, when the first multi-state flow control valve 26 is controlled in a first position (as shown), the active suspension system 20 operates in concert with the negative stiffness element 830.

Figure 9:
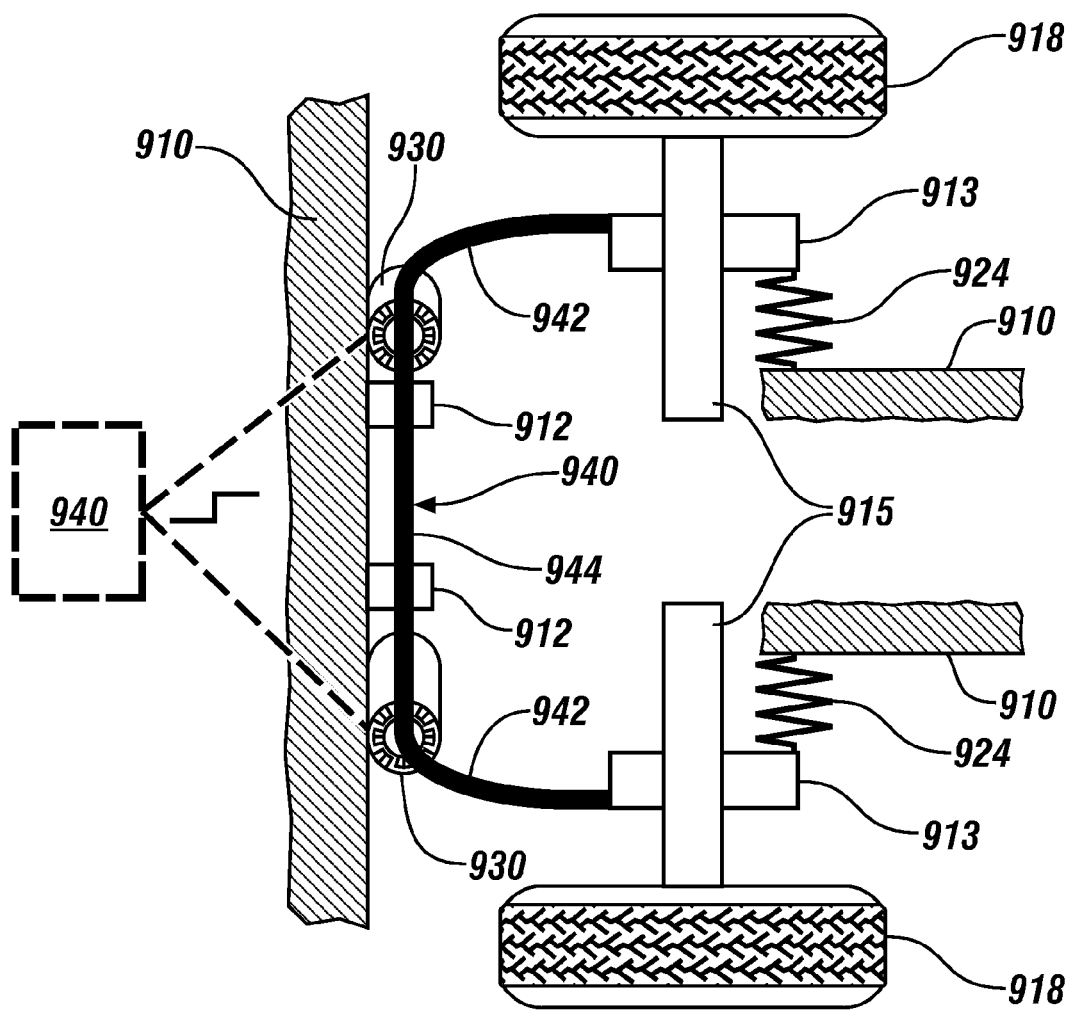
FIG. 9 illustrates a suspension configuration including an anti-roll bar employing negative stiffness elements that couples to vehicle wheels, in accordance with the disclosure.

FIG. 9 shows an embodiment of suspension system including an anti-roll bar 940 that employs negative stiffness elements 930 to dampen vibration between a sprung element, e.g., a vehicle body 910 and an unsprung element, e.g., vehicle wheels 918. The anti-roll bar 940 is a U-shaped device having a first portion 944 that mounts to the body 910 at brackets 912 and arm portions 942 that couple to each of brackets 913. The anti-roll bar 940 is preferably configured with the first portion 944 fabricated from steel or another suitable material having a high stiffness and the arm portions 942 fabricated from steel or another suitable material having a low stiffness. The negative stiffness elements 930 mount on the body 910 and operatively couple to the anti-roll bar 940 on the first portion 944 near the junctions with the arm portions 942. In one embodiment, the negative stiffness elements 930 employ opposed permanent magnets, an embodiment of which is shown with reference to FIG. 11. The wheels 918 mount on axle shafts 915 that couple to brackets 913 that couple to the vehicle body 910 using springs 924. Each of the negative stiffness elements 930 is configured to induce a moment on the anti-roll bar 940 that is opposite to force of the springs 924 under steady-state operation. The negative stiffness elements 930 induce moments on the anti-roll bar 940 that transfer to the wheels 918 under steady state vehicle operating conditions. During vehicle cornering maneuvers, the negative stiffness elements 930 do not interfere with the function of the anti-roll bar 940. In one embodiment, a controller 940 deactivates the negative stiffness elements 930 during vehicle cornering maneuvers. Alternatively, the negative stiffness elements 930 are passive devices having no external control.

Figure 10:
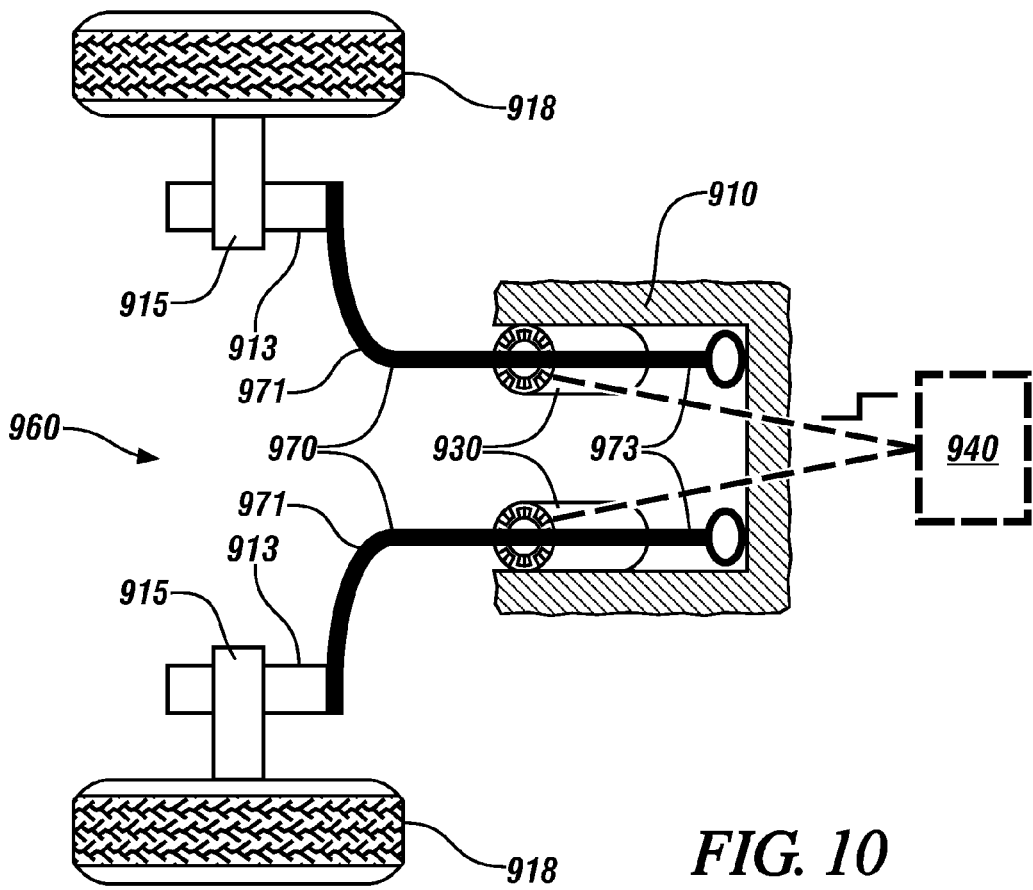
FIG. 10 illustrates a suspension configuration that includes torsion bars employing negative stiffness elements that couple to vehicle wheels, in accordance with the disclosure.

FIG. 10 shows a suspension configuration that includes a torsion bar 970 coupled to a vehicle wheel 918 via bracket 913 and an axle section 915. The torsion bar 970 couples to the vehicle body 910 via a hinge element. The torsion bar 970 is preferably configured with a first portion 973 fabricated from steel or another suitable material having a high stiffness and an arm portion 971 fabricated from steel or another suitable material having a low stiffness. A negative stiffness element 930 employing opposed permanent magnets couples to the body 910 and acts on the first portion 973 of the torsion bar 970. One embodiment of a configuration of the negative stiffness element 930 interacting with the torsion bar 970 is shown with reference to FIG. 11. The negative stiffness element 930 induces moments on the torsion bar 970 that transfer to the wheel 918 during steady-state operation, with the induced moment on the torsion bar 970 in opposition to force of the torsion bar 970 under steady-state operation. The negative stiffness element 930 is inactive, i.e., provides no contribution during vehicle cornering and other maneuvers that exert torsion on the rear or the front wheels. During vehicle cornering maneuvers, the negative stiffness elements 930 are inactive or are deactivated and thus do not interfere with the function of the torsion bar 970. In one embodiment, a controller 940 deactivates the negative stiffness elements 930 during vehicle cornering maneuvers. Alternatively, the negative stiffness elements 930 are passive devices having no external control.

Figure 11:
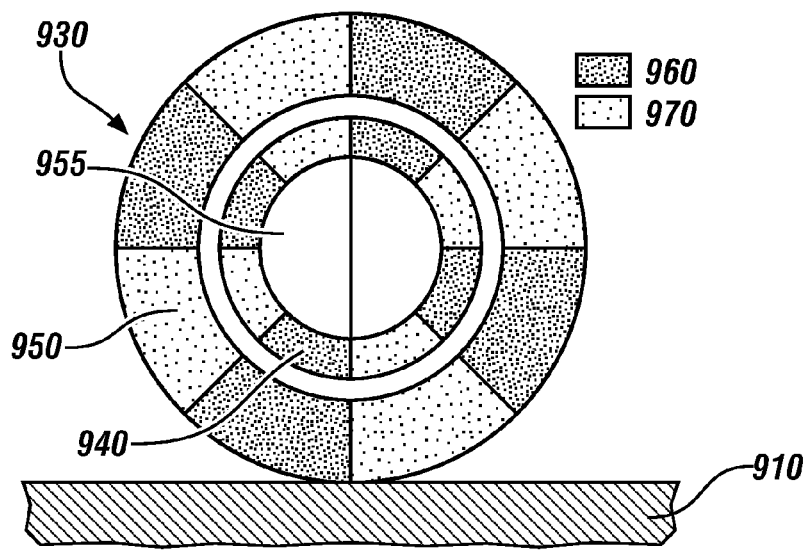
FIG. 11 illustrates a cross-sectional view of a negative stiffness element configured to interact with a suspension element, in accordance with the disclosure.

FIG. 11 shows a cross-sectional view of an embodiment of the negative stiffness element 930 configured to interact with a suspension element 955. The suspension element 955 is an anti-roll bar in one embodiment and a torsion bar in another embodiment. The negative stiffness element 930 includes an outer annular ring portion 950 coupled to the vehicle body 910. The outer annular ring 950 includes a plurality of circumferentially placed permanent magnets including north polarities 960 and south polarities 970. The suspension element 955 has a corresponding plurality of circumferentially placed permanent magnets 940 that are oriented such that the north polarities 960 of the outer annular ring 950 oppose the north polarities 960 of the permanent magnets 940 of the suspension element 955 and the south polarities 970 of the outer annular ring 950 oppose the south polarities 970 of the permanent magnets 940 of the suspension element 955.

Figures 1, 12:
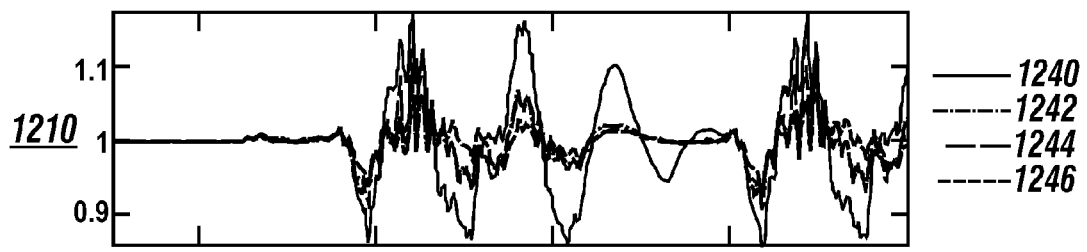
Figures 2, 12:
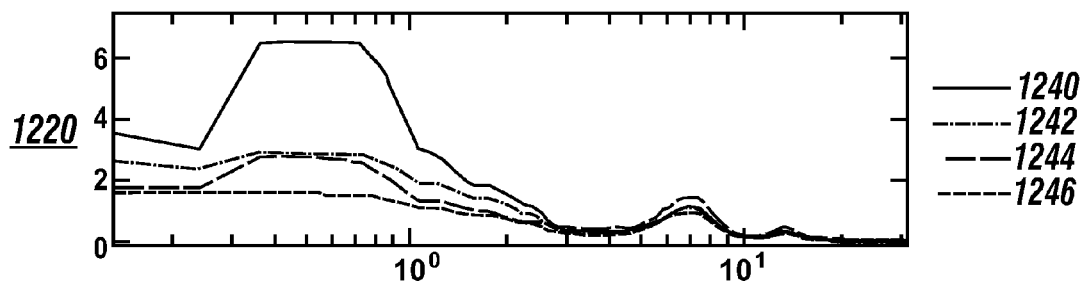
Figures 3, 12:
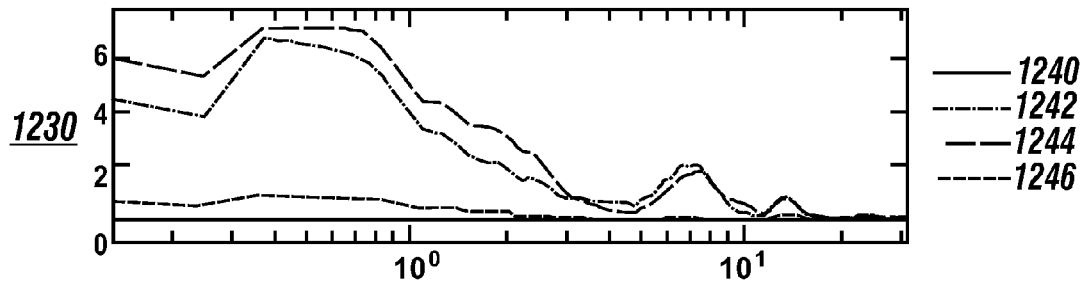

FIG. 12-1 graphically shows operating data associated with simulated performance of a vehicle executing a maneuver that tests suspension system performance including vehicle heave acceleration (g) on the vertical axis 1210 in relation to time (sec) on the horizontal axis 1215. FIG. 12-2 graphically shows operating data associated with simulated performance of a vehicle executing a maneuver that tests suspension system performance including vehicle heave acceleration (g) on the vertical axis 1220 in relation to frequency (Hz) on the horizontal axis 1225. FIG. 12-3 graphically shows operating data associated with simulated performance of a vehicle executing a maneuver that tests suspension system performance including energy flow (liter/min) on the vertical axis 1230 in relation to frequency (Hz) on the horizontal axis 1225.

Plotted data includes results for a simulated system employing an active suspension system including magnetorheological (MR) dampers 1240, a simulated system employing first and second embodiments of an active hydro-pneumatic (AHP) system for enhanced load accommodation and leveling 1242, 1244, and results for a simulated system employing an embodiment of a system employing AHP and a negative stiffness element 1246. The results indicate that the system employing the AHP in conjunction with negative stiffness element 1246 provides minimum magnitude and oscillations of heave and minimum energy consumption as compared to the related systems.

Figure 13:
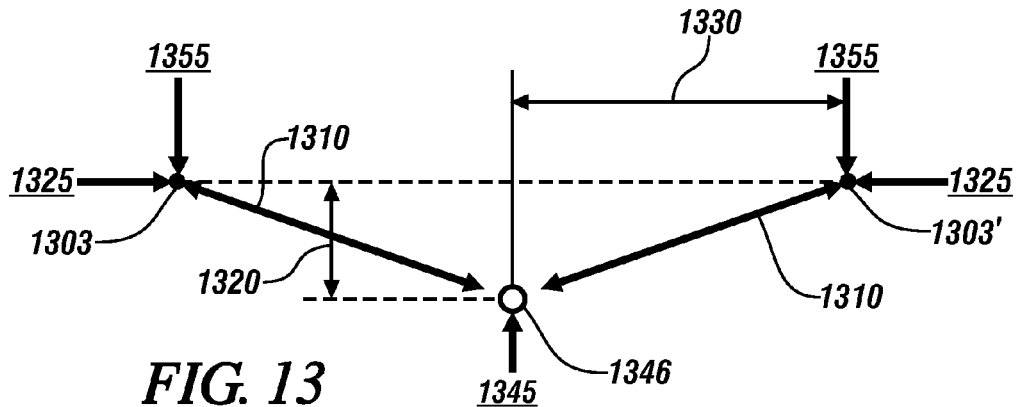
FIG. 13 illustrates a free-body diagram showing forces and moment arms for an embodiment of the active suspension system of FIG. 6 having a negative stiffness element in the form of a spring in tension between distal ends of rigid members each having proximal ends that couple to a junction, in accordance with the disclosure.

FIG. 13 depicts a free-body diagram showing forces and moment arms for an embodiment of the active suspension system described with reference to FIG. 6 having a negative stiffness element in the form of a spring in tension between distal ends of rigid members each having proximal ends that couple to a junction 1346. As shown, the spring is in the form of force vectors p 1325, which are acting along with force from the body 1355 and compressive forces from the rigid members 1315 at points 1303 and 1303'. Normal force $F_N$ 1345 acts at junction 1346, and is described as the force necessary to hold the negative stiffness element in steady state. The normal force $F_N$ at junction 1345 can be determined in accordance with the following relationship.

$$F_N = \frac{2p}{y}x = \frac{2k_{spring}(2\sqrt{l^2-x^2}-2l-\Delta l)}{\sqrt{l^2-x^2}}x \quad [3]$$

wherein p is the spring force 1325 of the negative stiffness element,
 $\Delta l$ is a nominally horizontal initial deflection of the negative stiffness element, indicating a pre-load on the negative stiffness element,
 $k_{spring}$ is the spring stiffness of the negative stiffness element, l is the length 1310 of each of the rigid members,
 x is the vertical deflection 1320 of the junction 1346,
 y is the horizontal distance 1330 to the junction 1365.

The characteristics of the negative stiffness element can be adjusted by varying the length l of the rigid members, varying the pre-load $\Delta l$ on the negative stiffness element, and varying the spring stiffness $k_{spring}$ of the negative stiffness element.

By way of example, a non-linear force relation for a negative stiffness element can be described using a version of Eq. 3 as follows.

$$F_N = \frac{2k_{spring}(2\sqrt{l^2-x^2}-2l-\Delta l)}{\sqrt{l^2-x^2}}x \quad [4]$$

For a known desired negative stiffness constant at a vertical deflection of x=0 ($x_0$), the spring rate can be expressed as follows:

$$k_0 = \gamma \cdot k_p, \gamma = 0 \ldots 1$$

wherein $k_p$ is a positive spring rate for the linear spring.

The spring constant $k_{spring}$ for the negative stiffness element can be determined in accordance with the following relationship.

$$\frac{2k_{spring}\Delta l}{l} = k_0 \rightarrow k_{spring} = \frac{lk_0}{2\Delta l} \quad [5]$$

This includes determining a preferred initial deflection $\Delta l$ for the negative stiffness element in accordance with the following relationship.

$$\Delta l = 2l - 2\sqrt{l^2 - x_0^2} \quad [6]$$

When the initial vertical deflection $x_0$ is determined in accordance with the following relationship:

$$\Delta l = 2l \rightarrow x_0 = 1, \quad [7]$$

a linear negative stiffness constant $k_{NS}$ can be determined in accordance with the following relationship.

$$k_{NS} = k_0 = 4k_{spring} \quad [8]$$

This permits a design that considers variation in the initial pre-loading $\Delta l$ of the negative stiffness element to set the initial vertical deflection point $x_0$ at which the force of the negative stiffness element vanishes to achieve different non-linear performance characteristics in the suspension.

Figure 14:
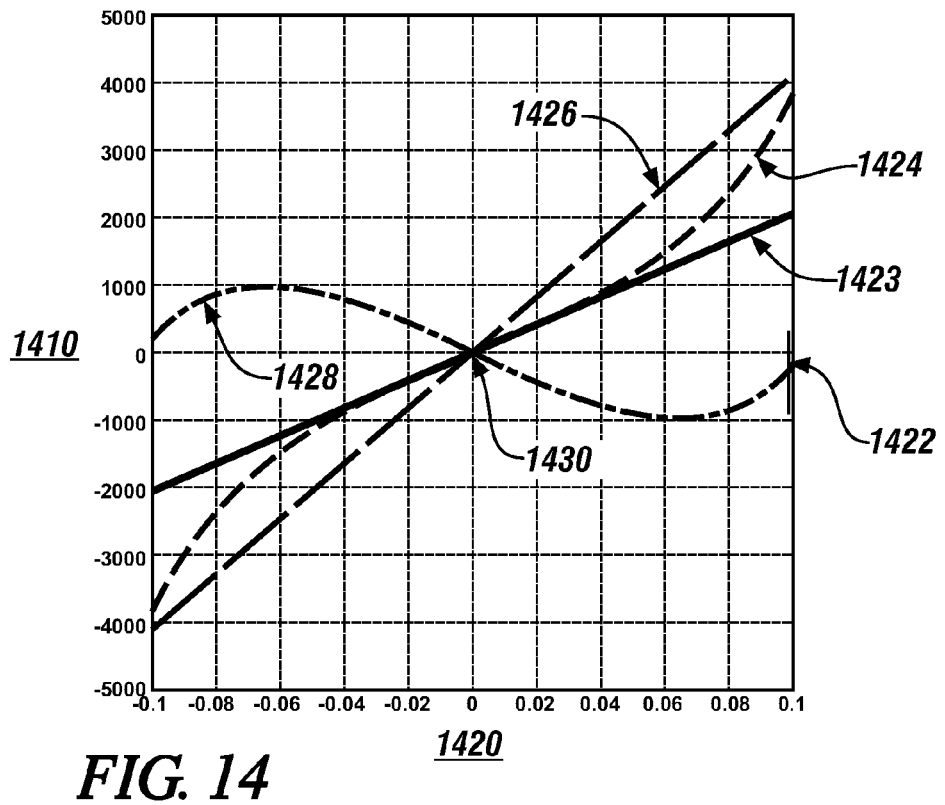
FIG. 14 illustrates deflection (m, travel) in relation to load (N) for an embodiment of the suspension system described herein including a negative stiffness element, in accordance with the disclosure.

FIG. 14 graphically shows the relevant terms in context of vertical deflection (m, travel) on a horizontal axis 1420 and load (N) on a vertical axis 1410 for a suspension system employing an embodiment of the suspension assembly described herein including a negative stiffness element. A positive spring rate $k_p$ representing the total positive spring rate of the suspension without the negative stiffness element is shown on line 1426 without a static load carrying component, including a zero vertical deflection point 1430. A negative stiffness element having a non-linear displacement is shown at line 1428, including an initial deflection point $\Delta l$ at 1422. Line 1424 graphically shows deflection for a system that combines the spring rate for the suspension shown on line 1426 and the negative stiffness element having non-linear displacement shown at line 1428. At the zero vertical deflection point 1430, the negative stiffness element has zero-deflection spring rate $k_0$. Line 1423 depicts a total spring rate as a result of a numerical sum of the linear spring rate $k_p$ and the zero-deflection spring rate $k_0$ of the negative stiffness element. The initial deflection point Δl at point 1422 indicates a deflection point at which the negative stiffness element no longer exerts force upon the suspension system.

Figure 15:
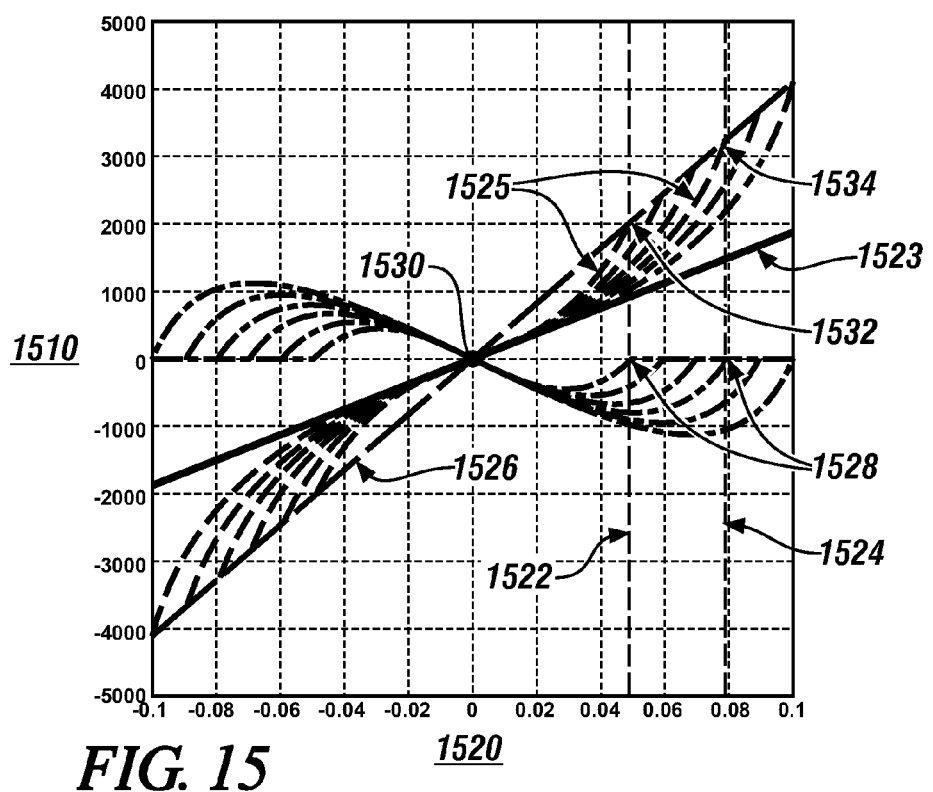
FIG. 15 illustrates deflection (m, travel) in relation to load (N) for an embodiment of the suspension system described herein including a negative stiffness element having a plurality of non-linear displacements indicated by a plurality of initial deflection points, in accordance with the disclosure.

FIG. 15 graphically shows the relevant terms in context of deflection (m, travel) on a horizontal axis 1520 and load (N) on a vertical axis 1510 for a suspension system employing an embodiment of the suspension system described herein including a negative stiffness element having a plurality of non-linear displacements shown at line 1528 and indicated by a plurality of initial deflection points x0, including by way of example, point 1522 depicting an initial deflection point x0 of 0.05 m and point 1524 depicting an initial deflection point x0 of 0.0.08 m. The relation shown with reference to EQ. 6 can be employed to determine the corresponding initial spring deflection Δl. A positive spring rate representing the total positive spring rate of the suspension without the negative stiffness element is shown on line 1526 without a static load carrying component, and depicts a linear spring rate $k_p$ between the deflection and the load, including a zero vertical deflection point 1530. Line 1523 depicts deflection as a result of a numerical sum of the linear spring rate $k_p$ and the zero-deflection spring rate $k_0$, which is a linear negative stiffness constant.

Lines 1528 graphically show a plurality of non-linear displacements associated with initial spring deflections Δl, including an initial spring deflection Δl corresponding to point x0=0.05 m, shown at 1522 and an initial spring deflection Δl corresponding to point x0=0.08 m, shown at 1524. Lines 1525 graphically show a plurality of deflections for a system that combines the spring rate for the suspension shown on line 1526 and the negative stiffness element having a plurality of non-linear displacements shown at lines 1528. This includes line 1532, which shows the deflection for a system that combines the spring rate for the suspension shown on line 1526 and the negative stiffness element having an initial spring Δl deflection corresponding to point x0=0.05 m, shown at 1522. This includes line 1534, which shows the deflection for a system that combines the spring rate for the suspension shown on line 1526 and the negative stiffness element having an initial spring Δl deflection corresponding to point x0=0.08 m, shown at 1524. As such, varying the initial pre-load in the spring can be employed to vary the point x0 at which the negative stiffness element ceases to exert force in the suspension.

The suspension assembly including active suspension and negative stiffness is configured to support a large load statically with a low dynamic stiffness to isolate vibration. Preferably the total spring rate of the combined elements of the suspension assembly is at or near zero under static loading. Such a combination of active suspension and negative stiffness that is achievable using various technologies includes a mechanism for engaging and disengaging the negative stiffness and reducing energy consumption during cornering maneuvers.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A suspension assembly between a sprung element and an unsprung element, comprising:
    an active suspension system arranged between the sprung element and the unsprung element, the active suspension system comprising a controllable load-carrying spring element;
    a negative stiffness element arranged between the sprung element and the unsprung element the negative stiffness element comprising a first opposed member connected in parallel to a second opposed member at a junction point, the first and second opposed members having a pre-loaded force exerted on the distal ends in a horizontal direction towards the junction point;
    said negative stiffness element configured to:
        urge the sprung element away from the unsprung element and having a negative stiffness constant that opposes a positive spring rate of the active suspension system to achieve a zero total spring stiffness of the suspension assembly under static conditions; and
        be engaged or disengaged based on a desired stiffness between the sprung element and the unsprung element.

2. The suspension assembly of claim 1, wherein the active suspension system is arranged in parallel with the negative stiffness element between the sprung element and the unsprung element.

3. The suspension assembly of claim 1, wherein the negative stiffness constant of the negative stiffness element is non-linear.

4. The suspension assembly of claim 1, wherein the negative stiffness constant of the negative stiffness element is linear.

5. The suspension assembly of claim 1, wherein the negative stiffness element comprises opposed fluidic cylinders configured to urge the sprung element away from the unsprung element employing fluid pressure supplied from the active suspension system.

6. The suspension assembly of claim 1, wherein the negative stiffness element comprises a plurality of opposed permanent magnets that are configurable to a first position in a mutually repelling state and configurable to a second position in a non-mutually repelling state.

7. The suspension assembly of claim 1, wherein the negative stiffness element comprises a mechanical spring configured to urge the sprung element away from the unsprung element.

8. The suspension assembly of claim 7, wherein the mechanical spring effects the negative stiffness constant opposing the positive spring rate of the active suspension system to achieve a total spring stiffness of the suspension assembly that approaches zero under static conditions.

9. The suspension assembly of claim 1, wherein the negative stiffness element comprises a spring element exerting a tensile force between first and second junctions, the first and second junctions including ends of first opposed members having distal ends coupled to the sprung member and ends of second opposed members having distal ends coupled to the unsprung member.

10. The suspension assembly of claim 9, wherein said spring element exerts the tensile force based upon a negative stiffness constant, the negative stiffness constant determined in relation to a spring constant for the spring, a pre-loaded force applied by the spring to the first and second junctions, and lengths of the second opposed members having distal ends coupled to the sprung member.

11. A suspension system for a body of a vehicle, comprising:
    a respective suspension assembly for each of a plurality of vehicle wheels in contact with a ground surface, each suspension assembly including a respective controllable suspension system arranged with a respective negative stiffness element between the body and the respective vehicle wheel;

each controllable suspension system comprising a respective load-carrying spring element; and each negative stiffness element comprising a first opposed member connected in parallel to a second opposed member at a junction point, the first and second opposed members having a pre-loaded force exerted on the distal ends in a horizontal direction towards the junction point;

each negative stiffness element configured to:

urge the body away from the respective vehicle wheel and having a respective negative stiffness constant that opposes a respective positive spring rate of the respective controllable suspension system to achieve a total spring stiffness of the respective suspension assembly that approaches zero under static conditions; and be engaged or disengaged based on a desired stiffness between the body and the respective vehicle wheel.

12. The suspension system of claim 11, further comprising an anti-roll bar configured between the body and the vehicle wheels wherein the anti-roll bar includes a respective negative stiffness element configured to induce a moment on the anti-roll bar opposing a force induced by suspension springs of the vehicle wheels under steady-state operation.

13. The suspension system of claim 12, wherein the negative stiffness element of the anti-roll bar comprises a permanent magnet device configured to induce the opposing moment on the anti-roll bar.

14. The suspension system of claim 11, further comprising a torsion bar configured between the body and one of the vehicle wheels wherein the torsion bar includes a respective negative stiffness element configured to induce a moment on the torsion bar opposing a force of the torsion bar on said one of the vehicle wheels.

15. The suspension system of claim 14, wherein the negative stiffness element of the torsion bar comprises a permanent magnet device configured to induce the opposing moment on the torsion bar.

16. The suspension assembly of claim 11, wherein each negative stiffness element comprises respective opposed fluidic cylinders configured to urge the body away from the respective vehicle wheel employing fluid pressure supplied from the controllable suspension system.

17. The suspension assembly of claim 11, wherein each negative stiffness element comprises a respective plurality of opposed permanent magnets that are configurable to a first position in a mutually repelling state and configurable to a second position in a non-mutually repelling state.

18. The suspension assembly of claim 11, wherein the negative stiffness element comprises a mechanical spring configured to urge the body away from the vehicle wheel.

* * * * *